United States Patent

Wauke

Patent Number: 6,072,656
Date of Patent: Jun. 6, 2000

[54] STEPPING MOTOR CONTROL METHOD

[75] Inventor: Tomokuni Wauke, Fukushima-ken, Japan

[73] Assignee: Alps Electric Co., Ltd., Tokyo, Japan

[21] Appl. No.: 08/918,409

[22] Filed: Aug. 26, 1997

[30] Foreign Application Priority Data

Sep. 9, 1996 [JP] Japan ................................. 8-237980

[51] Int. Cl.[7] ...................................................... G11B 5/55
[52] U.S. Cl. ........................................ 360/78.13; 318/696
[58] Field of Search .................................. 360/78.13, 75; 318/685, 696

[56] References Cited

U.S. PATENT DOCUMENTS

| 4,612,588 | 9/1986 | Tsukahara | 360/78.13 X |
| 5,264,771 | 11/1993 | Kawauchi | 360/78.13 X |

FOREIGN PATENT DOCUMENTS 4-79793  3/1992  Japan .

*Primary Examiner*—Paul Loomis
*Assistant Examiner*—James L Habermehl
*Attorney, Agent, or Firm*—Brinks Hofer Gilson

[57] ABSTRACT

In a stepping motor control method having an object for correctly and relatively simply determining the position of a pseudo-track center in the dead zone of a stepping motor, a forwardly and reversely rotatable stepping motor is rotated by that a plurality of the excitation phases thereof are sequentially driven by a driving pulse, a head is moved to a predetermined track position of a disc-shaped recording medium, a predetermined one of the excitation phases of the stepping motor is additionally driven by being intermittently supplied with a driving current for a minute period of time when the head moves to the predetermined track position and enters the dead zone of the stepping motor and the head is stopped at an end of the dead zone of the stepping motor.

3 Claims, 3 Drawing Sheets

STEPPING MOTOR CONTROL METHOD

BACKGROUND OF THE INVENTION

1. Field of the Invention

The present invention relates to a stepping motor control method, and more specifically, to a stepping motor control method of securely moving a head to a predetermined track position of a disc-shaped recording medium such as a floppy disc or the like by a stepping motor.

2. Description of the Related Art

Conventionally, a recording/reproducing apparatus making use of a disc-shaped recording medium such as a floppy disc or the like has used a head driving mechanism including a stepping motor in order to move a head, which records and reads data to and from the disc-shaped recording medium, to a predetermined track position of the recording medium.

In this case, the head driving mechanism is composed of a carriage for holding the head, a motor driving circuit and a pulse generation circuit in addition to the stepping motor and the pulse generation circuit is connected to a controller composed of a microcomputer and the like disposed externally of the recording/reproducing apparatus. The stepping motor has a rotor directly coupled with an output shaft which is screwed to the carriage. When the output shaft is rotated simultaneously with the rotation of the rotor of the stepping motor, the carriage screwed to the output shaft is moved linearly, whereby the head which is held by the carriage is also linearly moved on the disc-shaped recording medium in the diameter direction thereof. Thus, the head moves from one track position to a predetermined track position.

In the above arrangement, when the stepping motor is driven and the head is moved from the one track position to a predetermined track position of the disc-shaped recording medium, the stepping motor is driven under the control executed in the following sequence. First, the controller generates a step pulse and a direction designation pulse and supplies them to the pulse generation circuit. Next, the pulse generation circuit generates a pulse for switching the excitation phase of the stepping motor in response to the thus supplied step pulse and direction designation pulse and supplies the pulse to the motor driving circuit. Subsequently, the motor driving circuit amplifies the pulse having been supplied thereto and then applies the pulse to the excitation phases of the stepping motor as a driving current and rotates the rotor and the output shaft of the stepping motor forwardly and reversely in accordance with the exciting polarity of the driving current. At the time, the carriage screwed to the output shaft is linearly moved on the disc-shaped recording medium in the inside diameter direction or the outside diameter direction thereof by the forward or reverse rotation of the output shaft to thereby move the head to the predetermined track position. When the head reaches the predetermined track position, the motor driving circuit stops the supply of the driving current to the excitation phases of the stepping motor and stops the head at the predetermined track position to thereby permit the head to access the track.

Incidentally, it is known that the stepping motor for moving the head ordinarily has a rotation characteristics that it rotates and stops at a different position when a load is imposed on the rotor and the output shaft, that is, so-called hysteresis rotation characteristics.

FIG. 5 is a characteristic graph showing the output torque characteristics of the stepping motor, wherein the ordinate represents torque T and the abscissa represents rotational angle $\theta$ of rotor.

As shown in FIG. 5, the stepping motor is arranged such that when the load imposed on the output shaft (rotor) is in an ideal no load state, a rotational force is applied to the rotor until an output torque becomes 0 even if the rotor is rotated in any one of a forwardly direction and a reverse direction and when the rotor is stopped at a rotational angle $\theta_0$ at which the output torque is made to 0. On the other hand, when any load is imposed on the output shaft (rotor) and the output torque T is within the range of a minute torque ($\pm Tf$) on both the sides of the center where a torque is zero, any rotational force is no longer applied to the rotor and the rotor stops at the time. In this case, since the rotational angle $\theta$ at which the rotor stops is determined by the magnitude of load imposed on the output shaft, the inertial of the load and the like, the position where the rotor stops corresponds to any rotational angle in the range from the rotational angle $-\theta f$ to the rotational angle $+\theta f$. When the rotor rotates forwardly, the hysteresis rotation characteristics are exhibited at a position which corresponds to a rotational angle near to the rotational angel $-\theta f$, whereas when the rotor rotates reversely, the hysteresis rotation characteristics are exhibited at a position which corresponds to a rotational angle near to the rotational angel $+\theta f$. Thus, the stepping motor has a dead zone within the range of the rotational angel ($\pm \theta f$).

Since the dead zone ordinarily has a width of about 10 $\mu$m when it is converted into the moving distance of the head, the width is smaller than the width of the track of the disc-shaped recording medium such as the floppy disc or the like which is about 110 $\mu$m.

As described above, the hysteresis rotation characteristics make it difficult to properly stop the head at a predetermined position on a predetermined track, preferably at a track center in the recording/reproducing apparatus which moves the head using the stepping motor. Further, when an error resulting from the assembling accuracy of the head and a temperature environment and the like in which the apparatus is used is added to the hysteresis rotation characteristics, the head may be moved to a track another than a predetermined track and may not be set to the predetermined track.

To prevent the above disadvantage, there has been proposed a head moving means for eliminating a head stop position error which is caused by the hysteresis rotation characteristics of a stepping motor in Japanese Unexamined Patent Publication No. 60-210198.

The head moving means according to Japanese Unexamined Patent Publication No. 60-210198 is arranged such that after a head is moved to a predetermined track position by a stepping motor, the stepping motor is repeatedly driven in a forward direction and a reverse direction by the switching of the excitation phases thereof and after it is rotated in any one of the directions, the rotation of the stepping motor is stopped and the head is properly stopped at a predetermined position on a predetermined truck, that is, at a track center.

The means according to Japanese Unexamined Patent Publication No. 60-210198 eliminates the head stop position error caused by the hysteresis rotation characteristics of a stepping motor and stops a head at the track center of a predetermined track position though not quite satisfactorily. Since the head is positioned in the dead zone of the stepping motor, however, the stepping motor must be repeatedly rotated in the forward direction and the reverse direction many times by the switching of the excitation phases thereof to correctly stop the head at the track center. Thus, the means has a problem that many operations are required to position the head.

An object of the present invention for solving the above problem is to provide a stepping motor control method capable of positioning a head in the dead zone of a stepping motor relatively simply as well as correctly.

SUMMARY OF THE INVENTION

To achieve the above object, the stepping motor control method of the present invention comprises means for setting an end of the dead zone of a stepping motor as a pseudo-track center, additionally driving, when a head is caused to enter the dead zone of the stepping motor by the rotation thereof, one of the excitation phases of the stepping motor by intermittently supplying a driving current thereto for a minute period of time, using the pseudo-track center as a positioning target and stopping the head at the pseudo-track center.

According to the above means, when the head is moved by the rotation of the stepping motor and enters the dead zone of the stepping motor at a predetermined track position, the predetermined one of the excitation phases of the stepping motor is intermittently driven additionally by being supplied with the driving current for the minute period of time a plurality of times, preferably five times or more, whereby the head can be securely stopped at the pseudo-track center. Since the head stops at the pseudo-track center of any track at all times, the head including a carriage can be adjusted in correspondence to a pseudo-track pitch, so that the head can be positioned simply and correctly.

DESCRIPTION OF THE PREFERRED EMBODIMENT

A stepping motor control method in an embodiment of the present invention is arranged such that a forwardly and reversely rotatable stepping motor is rotated in such a manner that a plurality of the excitation phases of the stepping motor are sequentially driven by a driving pulse to thereby move a head to a predetermined track position of a disc-shaped recording medium. When the head moves to the predetermined track position and enters the dead zone of the stepping motor, one of the excitation phases of the stepping motor is additionally driven by being intermittently supplied with a driving current for a minute period of time so that the head is stopped at an end of the dead zone.

In an example of the embodiment of the present invention, the predetermined one excitation phase is additionally driven by being intermittently supplied with the driving current just before the head stops at the dead zone of the stepping motor.

In another example of the embodiment of the present invention, the predetermined one excitation phase is additionally driven by being intermittently supplied with the driving current just after the head stops at the dead zone of the stepping motor.

According to the embodiment of the present invention, when the stepping motor is driven, the head is moved by the rotation of the stepping motor and enters the dead zone of the stepping motor at a predetermined track position of a disc-shaped recording medium, since a predetermined excitation phase of the stepping motor is additionally driven by being intermittently supplied with the driving current for a minute period of time a plurality of times, the head can be securely stopped at a pseudo-track center. As a result, since the head stops at the pseudo-track center of any track at all times, the head including a carriage can be adjusted in correspondence to a pseudo-track pitch, whereby the head can be positioned simply and correctly.

EXAMPLES

Examples of the present invention will be described below with reference to the drawings.

Figure 1:
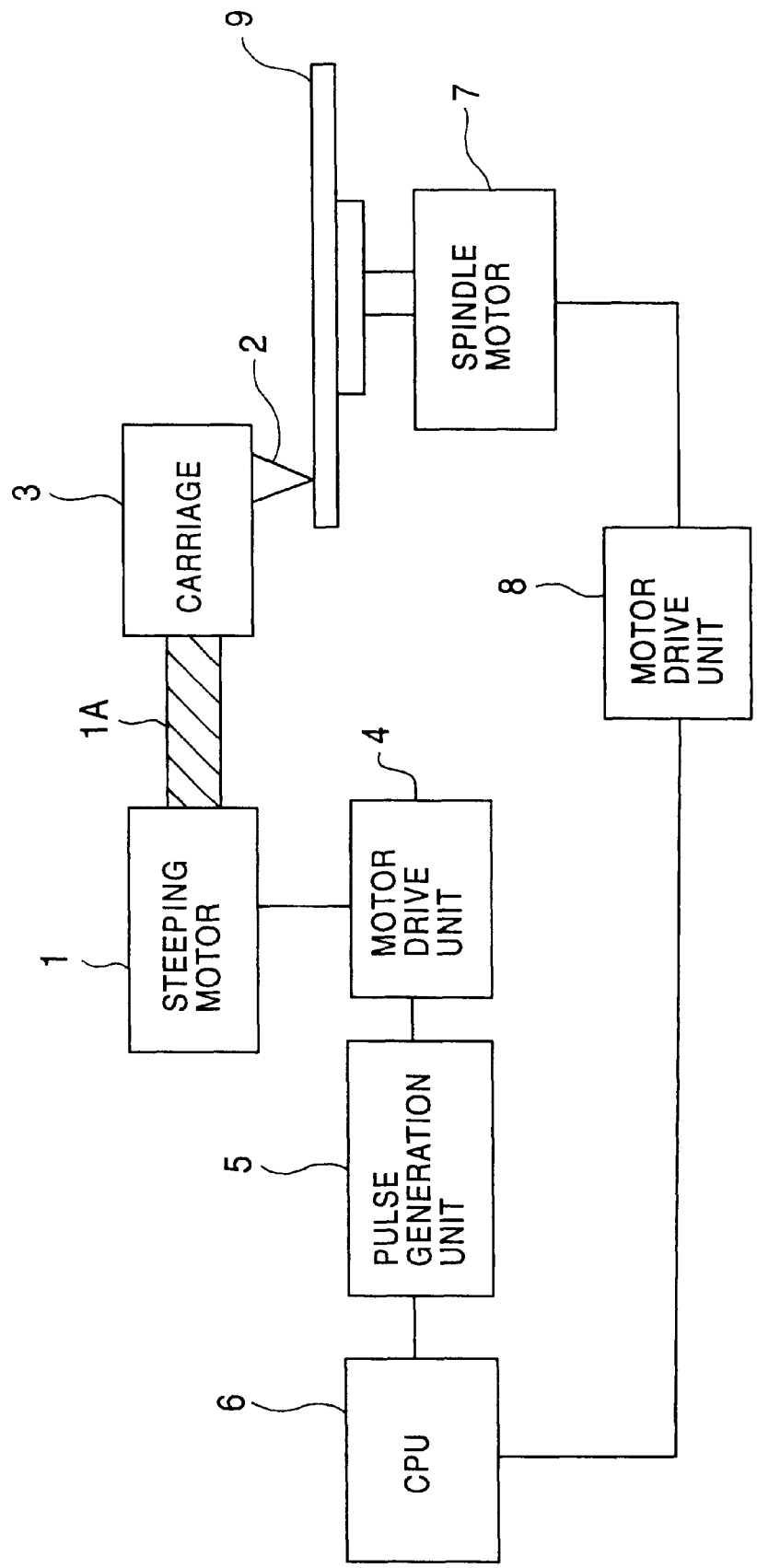
FIG. 1 is a block diagram showing an example the arrangement of a head driving mechanism for embodying a stepping motor control method according to the present invention.

FIG. 1 is a block diagram showing an example the arrangement of a head driving mechanism for embodying the stepping motor control method according to the present invention and the head driving mechanism constitutes a portion of a recording/reproducing apparatus.

In FIG. 1, the head driving mechanism is composed of a stepping motor 1, the output shaft 1A of the stepping motor 1, a carriage 3 for holding a head 2, a stepping motor drive unit 4 and a pulse generation unit 5 which is connected to a controller (CPU) 6 composed of a microcomputer and the like disposed externally of the recording/reproducing apparatus. In addition to the above, the recording/reproducing apparatus includes a spindle motor 7, a spindle motor drive unit 8, a floppy disc 9 and the like.

The stepping motor 1 has a rotor (not shown) directly coupled with the output shaft 1A which is screwed to the carriage 3. The carriage 3 holds the reading/writing (R/W) head 2 and as the carriage 3 moves in the diameter direction of the floppy disc 9, it moves the head 2 onto a predetermined track of the floppy disc 9 so that the head 2 accesses the track. The input of the stepping motor drive unit 4 is connected to the output of the pulse generation unit 5 and the output thereof is connected to the stepping motor 1. One of the outputs of the CPU 6 is connected to the input of the pulse generation unit 5 and the other of the outputs thereof is connected to the input of the spindle motor drive unit 8. The output of the spindle motor drive unit 8 is connected to the spindle motor 7 and the spindle motor 7 has a rotor (not shown) coupled with a floppy disc drive unit (not shown likewise) to rotate the floppy disc 9 by the rotation thereof.

Figure 2:
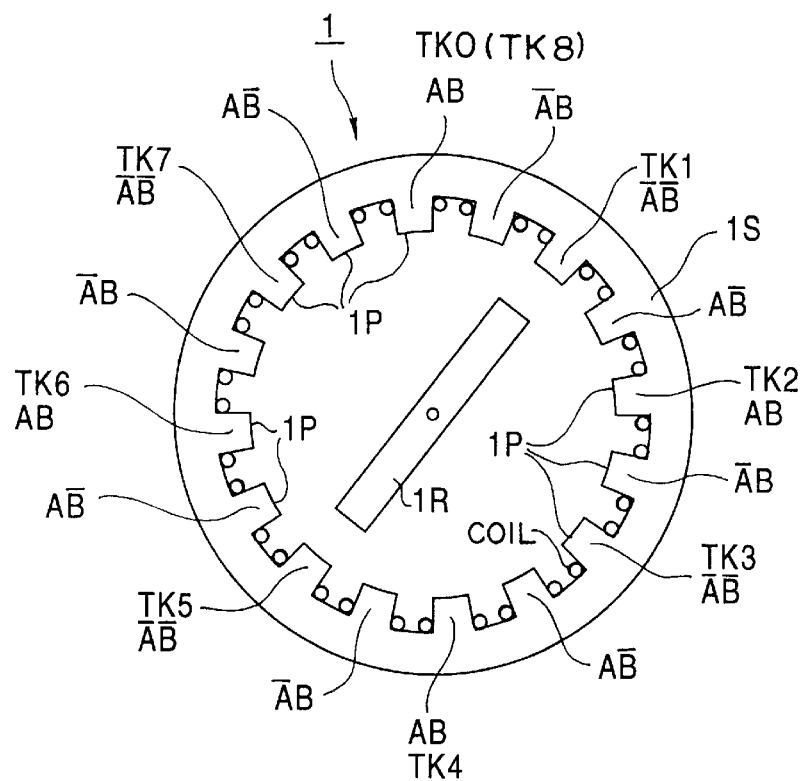
FIG. 2 is a sectional view showing an example of the arrangement of a stepping motor used to the head driving mechanism shown in FIG. 1.

FIG. 2 is a sectional view showing an example of the arrangement of the stepping motor 1 used to the head driving mechanism shown in FIG. 1.

As shown in FIG. 2, the stepping motor 1 is composed of an annular stator 1S and a rod-shaped rotor 1R disposed to the center of the stator 1S and having an N-pole and an S-pole located at both the ends thereof. A plurality of poles 1P are formed so as to project from the stator 1S inwardly and each four excitation phases AB, (−A)B, A(−B), (−A)(−B) are arranged by winding a coil 1C around each of the poles 1P (here, − (minus) indicates the reversal of polarity).

Figure 3:
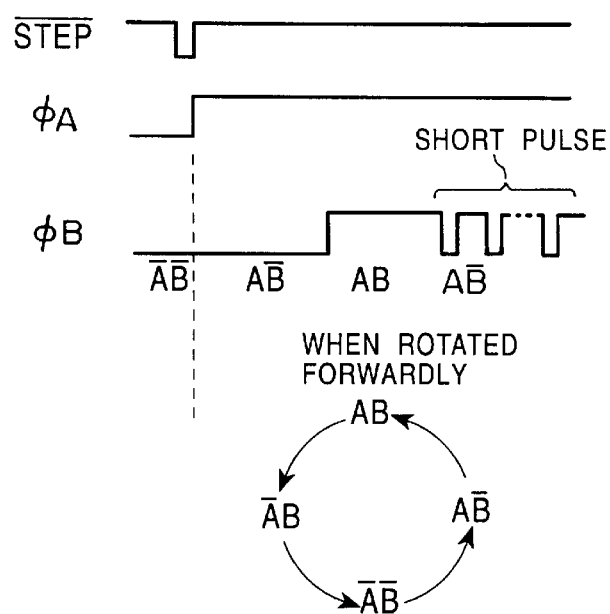
FIG. 3 is a graph of a driving waveform showing an example of the driving state of the stepping motor used in the head driving mechanism shown in FIG. 1.

FIG. 3 is a graph of a driving waveform showing an example of the driving state of the stepping motor used in the head driving mechanism shown in FIG. 1.

In FIG. 3, an upper stage shows a polarity reversal stepping waveform, a middle stage shows the driving waveform of an A-phase (φA) coil 1C and a lower stage shows the driving waveform of an B-phase (φB) coil 1C.

Figure 4:
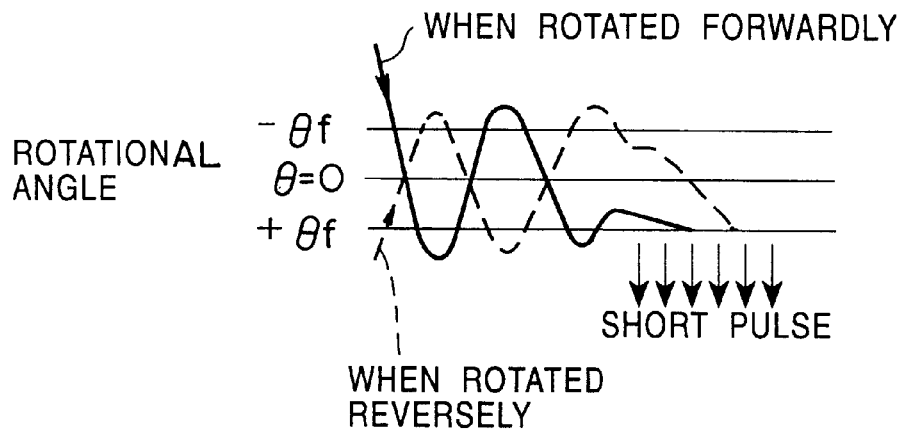
FIG. 4 is a graph explaining an example of the moving state of a head at a predetermined track position of a floppy disc when the stepping motor is driven by the driving waveform shown in FIG. 3.
Figure 5:
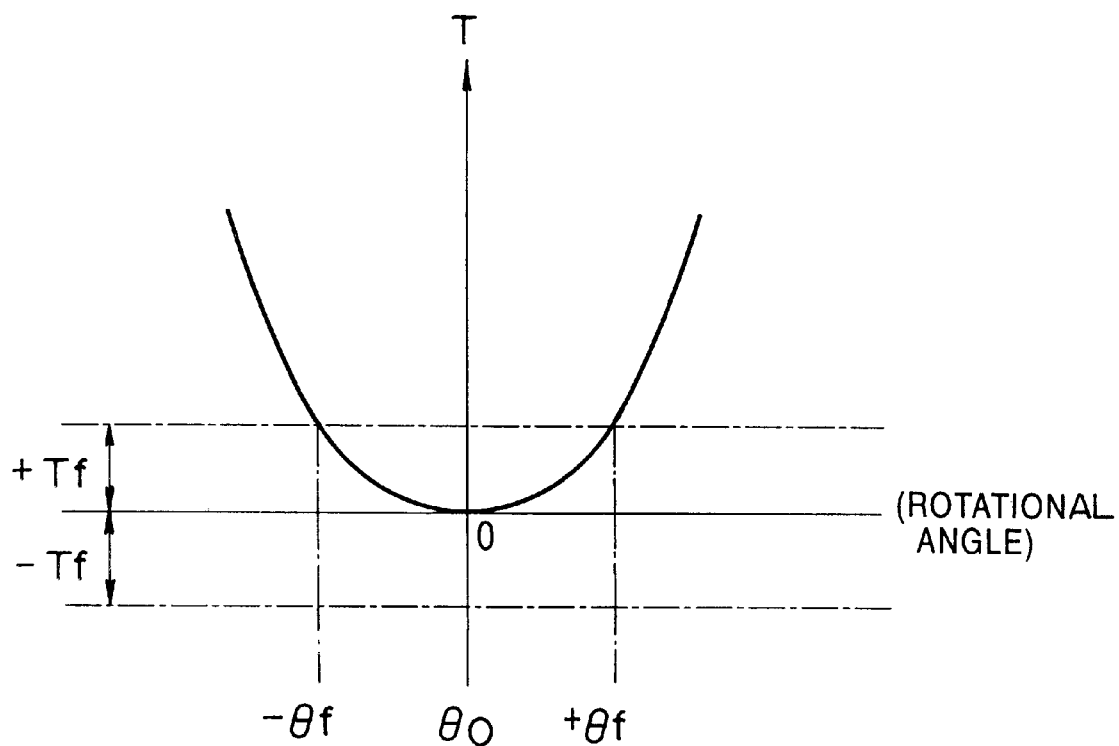
FIG. 5 is a characteristic graph showing the output torque characteristics of the stepping motor.

FIG. 4 is a graph explaining an example of the moving state of the head 2 at a predetermined track position of the floppy disc 9 when the stepping motor 1 is driven by the driving waveform shown in FIG. 3 In FIG. 4, the range of the rotational angel from −θf to +θf is the dead zone of the stepping motor 1 and a track center is located at a rotational angel $θ_0$. In the drawing, a solid line shows how the head 2 is moved by the forward rotation of the stepping motor 1, whereas a dotted line shows how the head 2 is moved by the reverse rotation thereof.

Operation of the stepping motor control method of the present invention will be described with reference to FIG. 1 to FIG. 4.

When the head 2 is moved from one track position of the floppy disc 9 to a predetermined track position thereof by driving the stepping motor 1, the stepping motor is controlled as described below. First, the controller 6 generates a step pulse and a direction designation signal and supplies them to the pulse generation unit 5. Next, the pulse generation unit 5 generates a pulse for switching the excitation phases of the stepping motor 1 in response to the thus supplied step pulse and direction designation pulse and supplies the pulse to the stepping motor drive unit 4. Subsequently, the stepping motor driving unit 4 amplifies the pulse having been supplied thereto and then converts the pulse into a driving current and sequentially applies the driving current to the four excitation phases AB, (−A)B, (−A)(−B), A(−B). When the four excitation phases are cyclically excited in the sequence of the excitation phase AB, the excitation phase (−A)B, the excitation phase (−A)(−B) and the excitation phase A(−B) and the excitation phase AB by the supply of the driving current, the rotor 1R of the stepping motor 1 is rotated forwardly as shown by the solid lines in FIG. 3 and FIG. 4, whereas when the four excitation phases are cyclically excited in the sequence of the excitation phase AB, the excitation phase A(−B), the excitation phase (−A)(−B), the excitation phase (−A)B and the excitation phase AB, the rotor 1R of the stepping motor 1 rotated reversely as shown by the dotted line in FIG. 4. The output shaft 1A is rotated forwardly or reversely by the rotation of the rotor 1R.

When the output shaft 1A is rotated, the carriage 3 screwed to the output shaft 1A is linearly moved on the floppy disc 9 in the outside diameter direction or the inside diameter direction thereof by the forward or reverse rotation of the output shaft 1A, whereby the head 2 is moved onto a predetermined track position.

When the head 2 reaches the predetermined track, the stepping motor drive unit 4 stops the alternate supply of the driving current to the four excitation phases of the stepping motor 1 as shown in FIG. 3. That is, when the stepping motor 1 is rotated forwardly by the cyclic supply of the driving current to the excitation phase AB, the excitation phase (−A)B, the excitation phase (−A)(−B), the excitation phase A(−B) and the excitation phase AB in this sequence, the supply of the riving current is stopped and then the driving current is intermittently supplied to the next excitation phase in the above sequence, that is, to the excitation phase A(−B) in the example shown in FIG. 3 for a minute period of time a plurality of times, preferably five times or more to thereby additionally drive the excitation phase A(−B), whereby the head 2 is moved in the direction toward an end of the dead zone of the stepping motor 1 at the predetermined track position and stopped at the one end of the dead zone as shown by the solid line in FIG. 4. At the time, the one end of the dead zone acts as the pseudo-track center of the predetermined track. Likewise, when the stepping motor 1 is rotated reversely by the cyclic supply of the driving current to the excitation phase AB, the excitation phase A(−B), the excitation phase (−A)(−B), the excitation phase (−A)B and the excitation phase AB in this sequence, the supply of the riving current is stopped and then the driving current is intermittently supplied to the next excitation phase in the above sequence, that is, to, for example, the excitation phase A(−B) for a minute period of time a plurality of times, preferably five times or more to thereby additionally drive the excitation phase A(−B), whereby the head 2 is moved in the direction toward an end of the dead zone of the stepping motor 1 at the predetermined track position and stopped at the one end of the dead zone, that is, at a pseudo-track center as shown by the dotted line in FIG. 4.

According to the stepping motor control method of the embodiment, the head 2 is moved by the rotation of the stepping motor 1 and when the head 2 enters the dead zone of the stepping motor at a predetermined track position, a predetermined one of the excitation phases of the stepping motor 1 is additionally driven by being intermittently supplied with the driving current for a minute period of time a plurality of times, by which the head 2 can be securely stopped at a pseudo-track center. Since the head 2 stops at the pseudo-track center of any track at all times, after the head 2 including the carriage 3 is assembled, it can be adjusted using a pseudo-track pitch as a target, so that the head 2 can be simply and correctly positioned. Further, since the dead zone of a stepping motor is inevitably determined when the stepping motor is determined, the position of one end the dead zone is also inevitably determined. As a result, the selection of the one end of the dead zone as the pseudo-track center permits various adjustments to be simplified and further each of the adjustments can be correctly executed.

Note, although the floppy disc is used as an example of the disc-shaped recording medium in the above embodiment, it is needless to say that the present invention is not limited to the case that the disc-shaped recording medium is the floppy disc but it is applicable to any other disc-shaped recording medium which is similar to the floppy disc likewise.

Further, although the one side of the dead zone of the stepping motor at a predetermined position is selected as the pseudo-track center, it is needless to say that the method of selecting the pseudo-track center in the present invention is not limited to the above method but the other end of the dead zone may be selected as the pseudo-track center.

As described above, according to the present invention, the head can be securely stopped at a pseudo-track center in such a manner that when the stepping motor is driven and the head is moved by the rotation of the stepping motor and enters the dead zone of the stepping motor at a predetermined track position of a disc-shaped recording medium, a predetermined one of the excitation phases of the stepping motor is additionally driven by being intermittently supplied with the driving current for a minute period of time a plurality of times to thereby securely stop the head at a pseudo-track center. Thus, the head stops at the pseudo-track center of any track at all times, whereby the head including the carriage can be adjusted in accordance with a pseudo-track pitch. As a result, there can be obtained an advantage that the head can be simply and correctly positioned.

What is claimed is:

1. A stepping motor control method comprising:

rotating a forwardly/reversely rotatable stepping motor by sequentially driving a plurality of excitation phases thereof by a driving pulse;

moving a head to a predetermined track position of a disc-shaped recording medium;

additionally driving only a predetermined one of the excitation phases of the stepping motor by intermittently supplying a driving current thereto for a minute period of time after the head has moved to the predetermined track position and entered a dead zone of the stepping motor; and stopping the head at an end of the dead zone, wherein the predetermined one of the excitation phases is a phase disposed immediately adjacent to the last excitation phase used to move the head into the dead zone and is the same no matter in which direction the stepping motor is rotated.

2. A stepping motor control method according to claim 1, wherein the one excitation phase is intermittently and additionally driven just before the head stops in the dead zone of the stepping motor.

3. A stepping motor control method according to claim 1, wherein the one excitation phase is intermittently and additionally driven just after the head stops in the dead zone of the stepping motor.

* * * * *